(12) United States Patent
Matsuda

(10) Patent No.: US 8,736,882 B2
(45) Date of Patent: May 27, 2014

(54) PRINTING SYSTEM, SERVICE PROCESSING METHOD, AND STORAGE MEDIUM

(75) Inventor: Kotaro Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 13/476,832

(22) Filed: May 21, 2012

(65) Prior Publication Data

US 2012/0307294 A1 Dec. 6, 2012

(30) Foreign Application Priority Data

Jun. 3, 2011 (JP) ................................. 2011-124867

(51) Int. Cl.
*G06F 3/12* (2006.01)
(52) U.S. Cl.
USPC ........... 358/1.15; 358/1.2; 358/1.8; 358/1.13; 358/1.16; 358/1.18
(58) Field of Classification Search
None
See application file for complete search history.

(56) References Cited

U.S. PATENT DOCUMENTS

| 8,537,408 | B2 * | 9/2013 | Natori et al. | 358/1.18 |
| 2006/0028659 | A1 * | 2/2006 | Nishikawa | 358/1.2 |
| 2007/0081180 | A1 * | 4/2007 | Abiko | 358/1.13 |
| 2010/0088592 | A1 * | 4/2010 | Hosotsubo | 715/255 |

FOREIGN PATENT DOCUMENTS

| JP | 2005-149218 A | 6/2005 |
| JP | 2010-092305 A | 4/2010 |

* cited by examiner

*Primary Examiner* — Miya J Cato
(74) *Attorney, Agent, or Firm* — Canon USA, Inc., IP Division

(57) ABSTRACT

A printing system includes a web application of a server apparatus to respond to a browser of a client apparatus and provides a print service to the client apparatus by controlling first and second data processing apparatuses in charge of the print service. The server apparatus requests the first data processing apparatus to store the document information in response determining that an edition service is registered to document information acquired from the browser. The second data processing apparatus applies layout adjustment processing to the document information to obtain a layout adjustment having a reduced number of pages value. The second data processing apparatus additionally compares the reduced number of pages value and a threshold value to determine whether reduced page printing is to be performed. If reduced page printing is not to be performed, the first data processing apparatus is instructed to delete a result of stored layout adjustment processing.

11 Claims, 15 Drawing Sheets

700

SETTING OF THRESHOLD VALUES FOR REDUCTION EFFECT DETERMINATION

SETTING 1.
DETERMINE THAT LAYOUT ADJUSTMENT IS EFFECTIVE FOR A PAGE REDUCTION IF THE REDUCED NUMBER OF PAGES IS THIS VALUE OR LARGER AFTER THE LAYOUT ADJUSTMENT

701
[ 2 ] PAGE(S)

SETTING 2.
DETERMINE THAT LAYOUT ADJUSTMENT IS EFFECTIVE FOR A PRINT SHEET REDUCTION IF THE REDUCED NUMBER OF PRINT SHEETS IS THIS VALUE OR LARGER AS A COMBINATION OF A RESULT OF LAYOUT ADJUSTMENT AND A RESULT OF IMPOSITION

702
[ 1 ] SHEET(S)

[ SAVE ] [ CANCEL ]

FIG.5
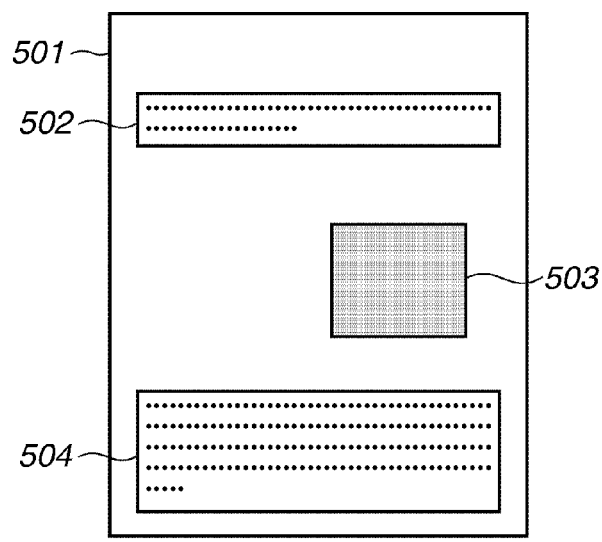
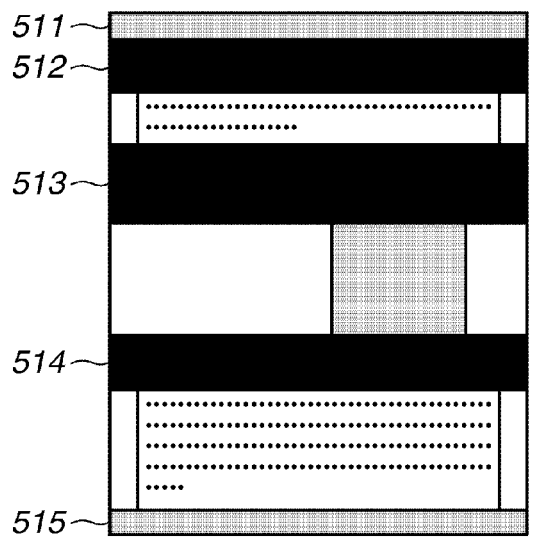
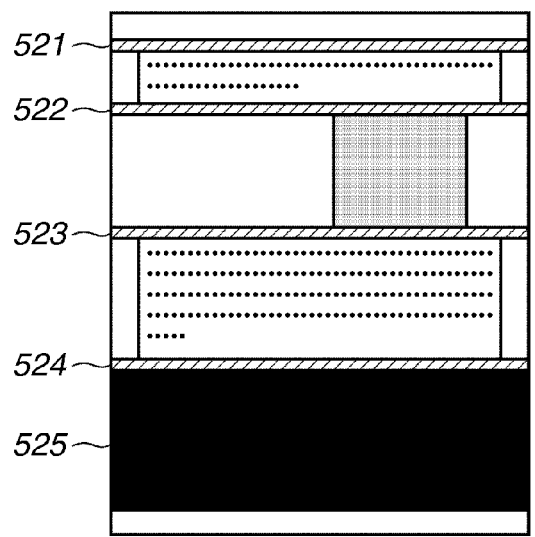

| DOCUMENT ID | ORIGINAL FILE | NUMBER OF PAGES OF ORIGINAL FILE | NUMBER OF PAGES AFTER LAYOUT ADJUSTMENT | REDUCED NUMBER OF PAGES | LAYOUT ADJUSTMENT RESULT FILE | THUMBNAIL FILE OF LAYOUT ADJUSTMENT RESULT PAGE |
|---|---|---|---|---|---|---|
| 1 | ¥¥storageserver ¥dmsservice ¥1¥xxx.doc | 20 | 16 | 4 | ¥¥storageserver ¥editservice¥1¥result ¥xxx.doc.result.pdf | ¥¥storageserver ¥editservice¥1 ¥thumb¥*.jpg |
| 2 | ¥¥storageserver ¥dmsservice ¥2¥yyy.pdf | 10 | 10 | 0 | ¥¥storageserver ¥editservice¥2¥result ¥yyy.pdf.result.pdf | ¥¥storageserver ¥editservice¥2 ¥thumb¥*.jpg |
| | | | | | | |

SETTING OF THRESHOLD VALUES FOR REDUCTION EFFECT DETERMINATION

SETTING 1.
DETERMINE THAT LAYOUT ADJUSTMENT IS EFFECTIVE FOR A PAGE REDUCTION IF THE REDUCED NUMBER OF PAGES IS THIS VALUE OR LARGER AFTER THE LAYOUT ADJUSTMENT

701 | 2 | PAGE(S)

SETTING 2.
DETERMINE THAT LAYOUT ADJUSTMENT IS EFFECTIVE FOR A PRINT SHEET REDUCTION IF THE REDUCED NUMBER OF PRINT SHEETS IS THIS VALUE OR LARGER AS A COMBINATION OF A RESULT OF LAYOUT ADJUSTMENT AND A RESULT OF IMPOSITION

702 | 1 | SHEET(S)

[ SAVE ] [ CANCEL ]

FIG.8
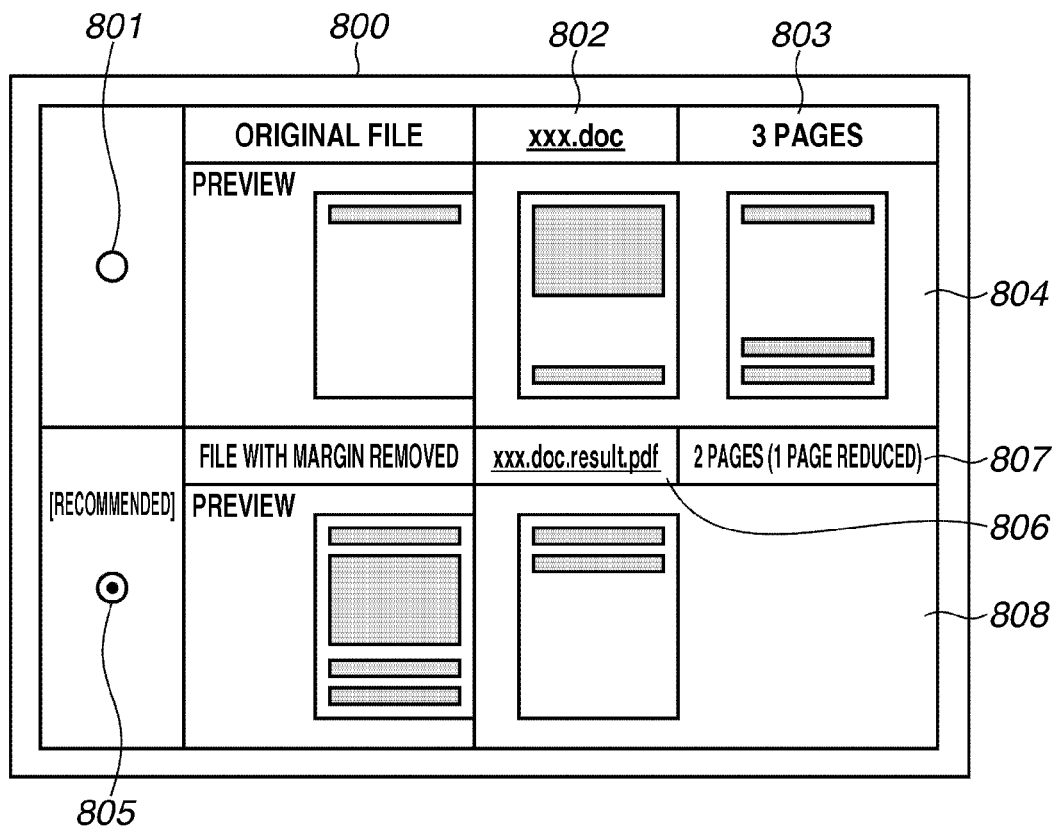
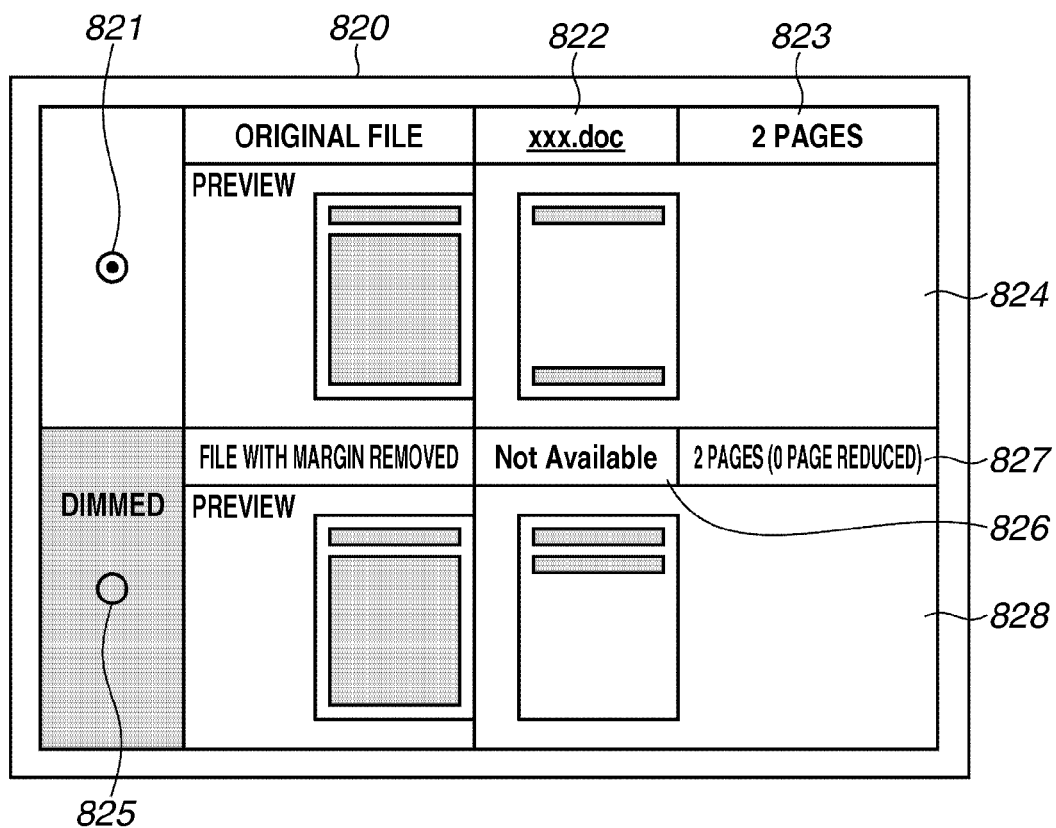

FIG.9
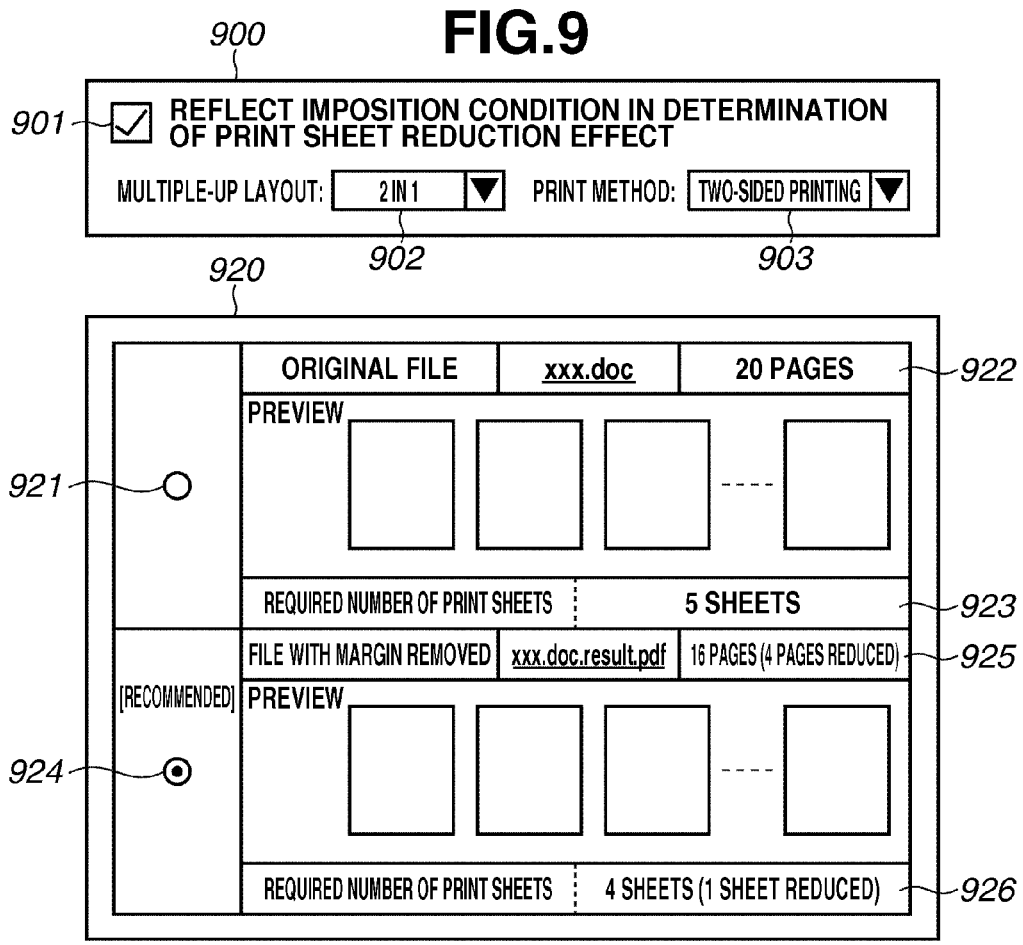
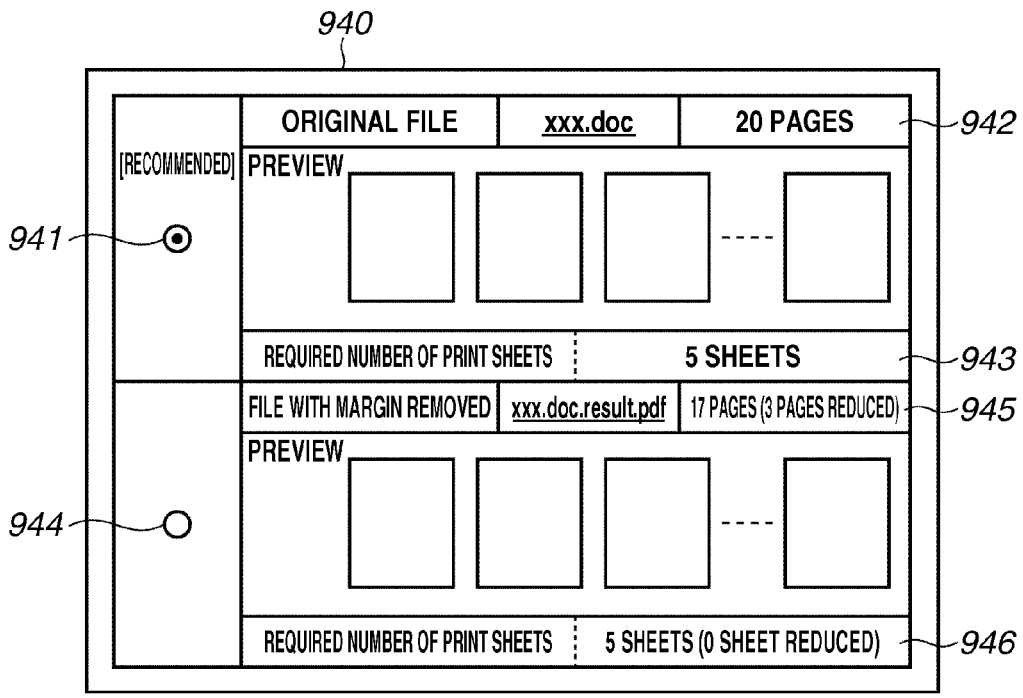

| TASK ID | TASK PRIORITY | TASK DESCRIPTION |
|---|---|---|
| 1002 | 10 | document_id=2 |
| 1004 | 10 | document_id=4 |
| 1003 | 5 | document_id=3 |
| 1001 | 1 | document_id=1 |
| 1005 | 1 | document_id=5 |

*1101*  *1102*  *1103*

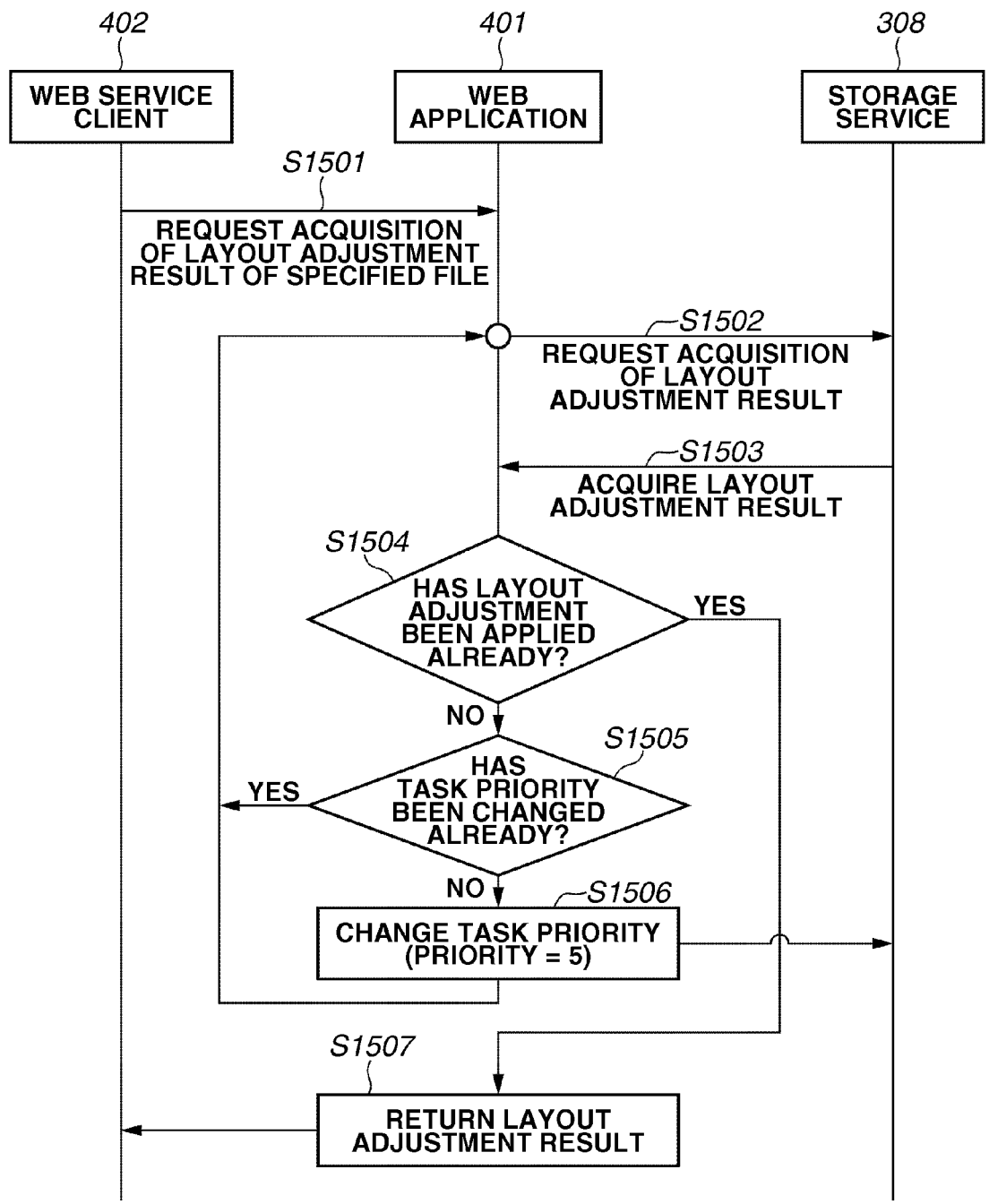

PRINTING SYSTEM, SERVICE PROCESSING METHOD, AND STORAGE MEDIUM

BACKGROUND OF THE INVENTION

1. Field of the Invention

The present invention relates to a printing system, a service processing method, and a storage medium.

2. Description of the Related Art

The present invention relates to a printing system, a service processing method, and a storage medium that stores a program for providing a print service.

In recent years, cloud computing (hereinafter referred to as "cloud") has been widespread mainly in the information technology (IT) industry. A trend shift has been accelerated from the conventional models where computer hardware and software are purchased and used to the models where services offered via the Internet are purchased and used. It is said that there are mainly three types of cloud models.

The first type cloud model is Software as a Service (SaaS), which is such a model that a service provider provides software via the Internet, and a service user uses desired software by mainly using a browser. The SaaS model is substantially similar to the model that was called Application Service Provider (ASP) previously.

All the service provider has to do is to build a web site for providing the software on the Internet, and the service provider does not have to distribute the software. A benefit on the service user side is that the user does not have to install dedicated software into the user's own computer, and generally, the user can use the desired software only by using a browser and a plug-in application therefor.

This feature of the SaaS model allows the user to use the service from not only a so-called personal computer but also a mobile terminal such as a mobile phone, a small laptop computer, and a tablet. Further, the user can also use the SaaS model from an imaging device such as a printer, a scanner, and a multifunction peripheral.

Many of these mobile terminals and imaging devices are not equipped with a display unit large enough to display a browser in a sufficiently user-friendly manner. Therefore, in some cases, the service provider distributes an application for accessing a special SaaS to offer a user interface (UI) that can be easily used even on a small screen.

Another object of such an application is to allow collaboration of a specific function of a mobile phone, a printer, or a multifunction peripheral, and a function provided by a SaaS system, which cannot be realized only by a browser. For example, if a user accesses a SaaS system from a mobile phone, the user can utilize collaboration of the service of the SaaS system with, for example, the telephone-call function, the camera function, and the global positioning system (GPS) function equipped with the mobile phone.

If a user accesses a SaaS system from a multifunction peripheral, the user can utilize collaboration of the service of the SaaS system with, for example, the scanning function and the printing function. Further, in some cases, even a device that does not use a UI or does not include a UI can exercise a function provided by a SaaS system by transmitting and receiving data to and from the SaaS system on the Internet. For example, one of these cases is that a printer connected to the Internet downloads print data from a SaaS system to print it.

The second type cloud model is Platform as a Service (PaaS), which is an application execution platform via the Internet. One example thereof is Windows (registered trademark) Azure Platform of Microsoft Corporation. Microsoft Corporation offers, for example, Windows (registered trademark) Azure, which is an application execution environment, and SQL Azure, which is a database execution environment.

The third type cloud model is Infrastructure as a Service (IaaS), which is a service for lending a virtual machine and a storage via the Internet. For example, Amazon.com Incorporated offers Amazon Elastic Compute Cloud (EC2), which is a service for lending a virtual machine, and Amazon Simple Storage Service (S3), which is a service for lending a storage.

When a service provider wants to start a new business using the Internet, the user can reduce an initial equipment investment by utilizing the PaaS and IaaS services, since these services eliminate the necessity of preparation of a computer environment by himself/herself. Mostly, the PaaS and IaaS services employ the model of charging according to how much the computer resource is used, so that the service provider can increase the computer resources on the PaaS and IaaS systems according to the business scale.

With the advancement of these cloud models, there has been studied and realized a model of connecting a printer or a multifunction peripheral to the Internet to allow them to use various kinds of services established in a cloud system.

From a point of view of a print service in the cloud system, one use case is to allow a user to print a file managed in a cloud system from a local printer. Conventionally, many providers have provided document management services as SaaS services.

On the other hand, conventionally, software called a printer driver has been in charge of conversion of data into print data and transmission of data to a printer for print control of the printer. The printer driver should be installed in advance into a computer that uses the printer.

However, providing the printer driver function as a cloud service can establish even an architecture allowing a printer connected to the Internet to directly receive print data to thereby print the data without an intervention of a driver. This is referred to as a virtual printer driver while the former is referred to as a local printer driver.

On the other hand, pre-processing that the printer driver performs before transmitting print data to the printer includes a print preparation process. Through this print preparation process, the printer driver generates intermediate data for printing from a file to be printed, and, for example, processes or edits this intermediate data, thereby being able to add an additive value to a final product output from the printer.

As one of this print preparation process, there has been proposed a method of reducing the number of pages of print data by "margin removal".

Japanese Patent Application Laid-Open No. 2005-149218 and Japanese Patent Application Laid-Open No. 2010-092305 discuss a method of dividing each page into a print target area and a margin area, removing the margin area, shifting the print target area to the front side of the page, thereby cutting out one or more last pages to reduce the number of pages.

Conventionally, execution of the print preparation process has required installation of a special application into a computer and use of it, as is the case with the above-described local printer driver. Generally, this kind of application is used in a stand-alone configuration, instead of a so-called client-server configuration or a web application configuration.

One of the reasons therefor is because intermediate data for printing and print data to be transmitted to a printer have a relatively large size. Due to the necessity of relatively many computer resources such as a central processing unit (CPU), a random access memory (RAM), and a hard disk drive (HDD) for processing them, it is considered that the stand-alone configuration is advantageous since the stand-alone configuration allows the dedicated application to occupy the computer resources.

Further, since print data should be finally transmitted to a printer via a printer driver, it is considered that it is advantageous to dispose this dedicated application in a computer located in the same network as the printer or a network near the printer. This is because data of a large size is transmitted via a network, and therefore a near network can be less affected by a delay and congestion in the network, thereby realizing further quicker transmission.

However, as the background of the above-described advancement of the cloud models, the speed of network lines such as the Internet and an intranet has been improved, which is accompanied by establishment of an environment allowing even data of a large amount to be transmitted and received at a sufficiently high speed.

As described above, for example, a document management and a virtual printer driver have been already able to be offered as SaaS services. Therefore, configuring even the print preparation process as a service in a cloud system allows a whole series of print work flow to be executed in the cloud system.

However, the following problems arise in establishment of a cloud system including such a value additive service that the paper resource can be saved by applying the technique of reducing the number of pages of print data by performing "margin removal", as discussed in the above-described patent documents, Japanese Patent Application Laid-Open No. 2005-149218 and Japanese Patent Application Laid-Open No. 2010-092305.

According to "margin removal" by layout adjustment, how many pages can be reduced varies and differs depending on the content of a document file due to the nature of the processing. In other words, the processing result and how many pages can be reduced are not determined until layout adjustment is actually performed.

The result is uncertain until layout adjustment is driven by a user in this way, so that it is impossible to notify the user of how many pages can be saved or to provide a preview in advance. Therefore, the first problem is that it is difficult to make an appeal about the resource saving effect by this print preparation process.

Further, in a case where the application for the print preparation process is offered in a stand-alone configuration like the conventional technique, a single user can occupy computer resources of a single computer for the corresponding application, arbitrarily select a file to be processed, and perform layout adjustment in a user driven manner. However, under a cloud-type or a web-type application execution environment, the computer resources are shared by all users.

Accepting a request for the print preparation process in a user driven manner results in an increase in the user's waiting time and the processing execution time, for example, during a busy period or processing of a file having a large data size. For a service provider, it is desired to become able to offer a requested service by using only minimum computer resources to reduce the operational cost.

On the other hand, the increase in the waiting time and the processing execution time deteriorates user's operability and convenience, which leads to the second problem. In other words, the second problem arises in the necessity of achieving two objects, i.e., avoiding keeping a user waiting as much as possible by using limited shared computer resources in this way.

With the aim of solving the first and second problems, one possible measure is to prepare a processing result in advance by performing layout adjustment on a server in a cloud system asynchronously so as to be able to quickly provide the processing result when a user requests it.

In this case, it is required to maintain a processing result file in addition to an original file, thereby leading to an increase in the required capacity of the storage resource in the cloud system, and an increase in the operation cost for the service provider side. This is the third problem. In this way, several problems should be solved simultaneously to provide the print processing service under a cloud environment.

SUMMARY OF THE INVENTION

The present invention is directed to a printing system for providing a print service capable of realizing a service of presenting a print page/sheet reduction effect to a user with use of a user interface without imposing a load to a system resource in response to a print request from a client.

According to an aspect of the present invention, a printing system in which a web application of a server apparatus configured to respond to a browser of a client apparatus provides a print service to the client apparatus by controlling a plurality of data processing apparatuses in charge of the print service, includes the server apparatus, wherein the server apparatus includes a first determination unit configured to determine, as a first determination of the printing system and using the server apparatus, whether an edition service to be performed in advance of the print service is registered to document information acquired from the browser, and a first request unit configured to request, as a first request of the printing system and using the server apparatus, a first data processing apparatus to store the document information in response to the first determination unit determining that the edition service is registered, the first data processing apparatus, wherein the first data processing apparatus is configured to perform a storage service, includes a storage unit, and further is configured to acquire, in response to a request from the first request unit and using the first data processing apparatus, the document information and store the document information in the storage unit of the first data processing apparatus as document information to which layout adjustment processing is to be applied, and a second data processing apparatus, wherein the second data processing apparatus includes a confirmation unit configured to confirm, as confirmation by the second data processing apparatus, whether the storage unit stores the document information to which layout adjustment processing is to be applied, a layout adjustment unit configured to acquire the document information from the storage unit in response to the confirmation unit confirming that the storage unit stores the document information to which the layout adjustment processing is to be applied and apply, as layout adjustment by the second data processing apparatus, the layout adjustment processing to the document information acquired from the storage unit to obtain a layout adjustment having a reduced number of pages value, a second request unit configured to request, as a second request of the printing system and using the second data processing apparatus, the first data processing apparatus to store a result of the layout adjustment processing as the layout adjustment, a second determination unit configured to determine, as a second determination of the printing system and using the second data processing apparatus, whether reduced page printing is to be performed by comparing the reduced number of pages value based on the result of the layout adjustment processing and a threshold value set in advance of the second determination, and a deletion instruction unit configured to instruct, as a deletion instruction of the printing system and using the second data processing apparatus, the first data processing apparatus to delete the result of the layout adjustment processing stored in the storage unit in response to the second determination unit determining as the second determination that the reduced page printing is not to be performed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates a layout adjustment function of an edition service illustrated in FIG. 4.

FIG. 6 illustrates an example of a table storing a layout adjustment result.

FIG. 7 illustrates an example of a UI displayed by the printing system.

FIG. 8 illustrates example UIs displayed by the printing system.

FIG. 9 illustrates example UIs displayed by the printing system.

FIG. 11 illustrates an example of a task processing table of the printing system.

FIG. 15 is a flowchart illustrating data processing performed by the printing system.

DESCRIPTION OF THE EMBODIMENTS

Various exemplary embodiments, features, and aspects of the invention will be described in detail below with reference to the drawings.

Figure 1:
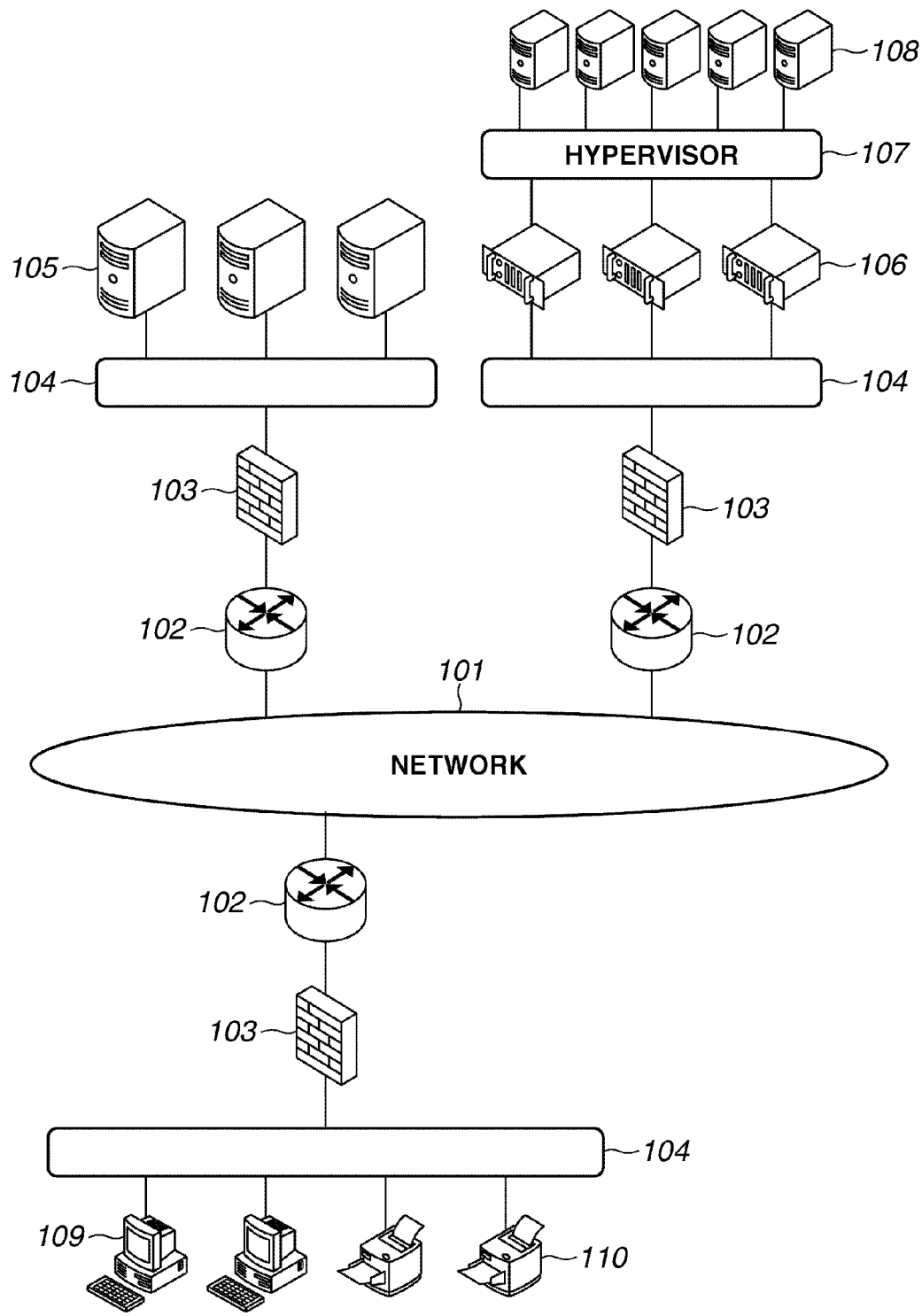
FIG. 1 illustrates a configuration of a printing system according to an exemplary embodiment.

FIG. 1 illustrates a configuration of a printing system according to an exemplary embodiment. This example corresponds to a system that performs print processing with use of a service based on a web application. More specifically, this example is an example of such a printing system that, in response to a browser of a client apparatus, a web application of a server apparatus controls a plurality of data processing apparatuses in charge of a print service to provide the print service to the client apparatus.

Service processing that the plurality of data processing apparatuses performs in cooperation with the server apparatus include, for example, a document management service, a storage service, an edition service, and a print service, which will be described below.

The present exemplary embodiment is one example of a printing system for deploying a print service effectively working under a cloud computing environment, but the configuration of the cloud computing environment is not limited to the printing system according to the present exemplary embodiment.

Referring to FIG. 1, a network 101 indicates the Internet or an intranet. Network apparatuses 102, such as a router or a switch, connect networks. Firewalls 103 control communication permission between the networks. Networks 104 each are a Local Area Network (LAN).

Data processing apparatuses 105 are apparatuses of the service provider side, and function as a first data processing apparatus, a second data processing apparatus, and a third data processing apparatus. The data processing apparatuses 105 are configured to be able to perform, for example, a document management service 403 (see FIG. 4), a storage service 308, and an edition service 404. Server computers 106 are servers or server apparatuses 106 of the service provider side, and are configured to be able to execute a web application 401, which will be described below.

The printing system may be configured in such a manner that the web application 401, the document management service 403, and the edition service 404, which will be described below, are individually performed by respectively independent server computers 106, or may be configured in such a manner that one data processing apparatus 105 is in charge of two services.

A virtual machine is an isolated guest operating system installation within a normal host computer operating system. A hypervisor, also called virtual machine manager (VMM), is a hardware virtualization technique allowing multiple operating systems to run as virtual machines concurrently on a host computer without disrupting each other. In the printing system of FIG. 1, a hypervisor 107 virtualizes computers. Virtual machines 108 work on the hypervisor 107. Client computers 109 are configured to be able to exchange data to receive a print processing service with the web application 401 on the server apparatuses 106 via browsers 301. Printers 110 are connected to the LAN 104 to which the client computers 109 are connected.

The client computers 109 and the printers 110 can access the web server and the application server executed by the server computers 106 and the virtual machines 108 via a network connection. The server computers 106, the virtual machines 108, and the client computers 109 illustrated in FIG. 1 each include hardware resources illustrated in FIG. 2.

Figure 2:
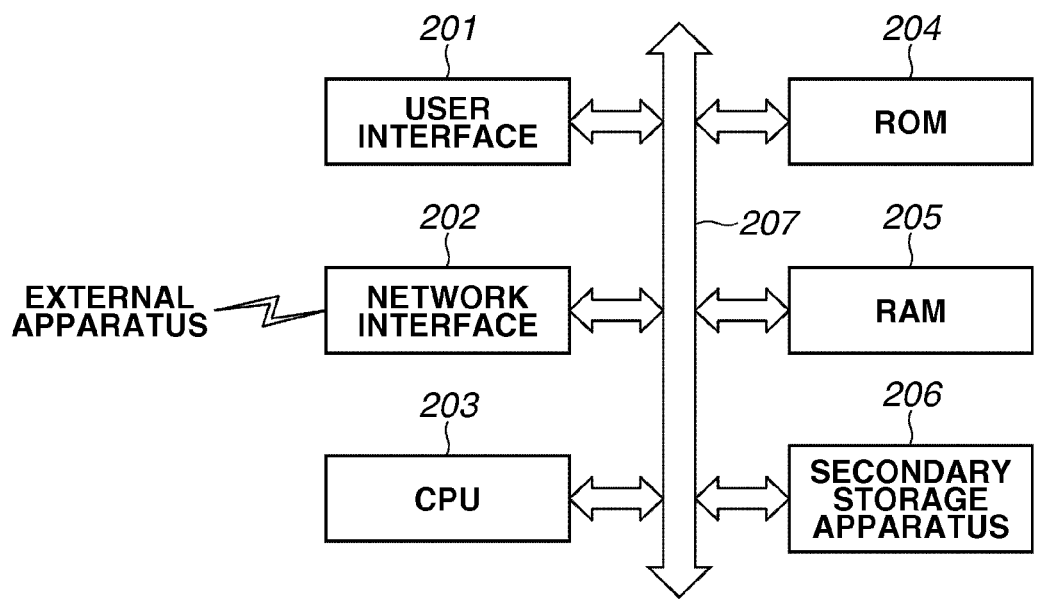
FIG. 2 is a block diagram illustrating hardware of the printing system illustrated in FIG. 1.

FIG. 2 is a block diagram illustrating hardware of the printing system illustrated in FIG. 1. Now, an example of the hardware of the server computers 106, the virtual machines 108, and the client computers 109 will be described. Even a computer that does not include the following hardware can be connected and operated from another computer by utilizing, for example, a remote desktop function.

Referring to FIG. 2, a user interface 201 includes, for example, hardware such as a display, a keyboard, and a mouse, and is used for an input and output of information. A network interface 202 is connected to a network such as the LAN 104, and in charge of communication with other computers (external apparatuses) or network apparatuses.

A read only memory (ROM) 204 stores an incorporated program and data. A random access memory (RAM) 205 is used as a temporary memory area of a CPU 203. The CPU 203 executes a program read in from, for example, the ROM 204, the RAM 205, or a secondary storage apparatus 206. The secondary storage apparatus 206 is constituted by, for example, a hard disk drive (HDD). The respective units are connected to one another via an input/output interface 207.

Figure 3:
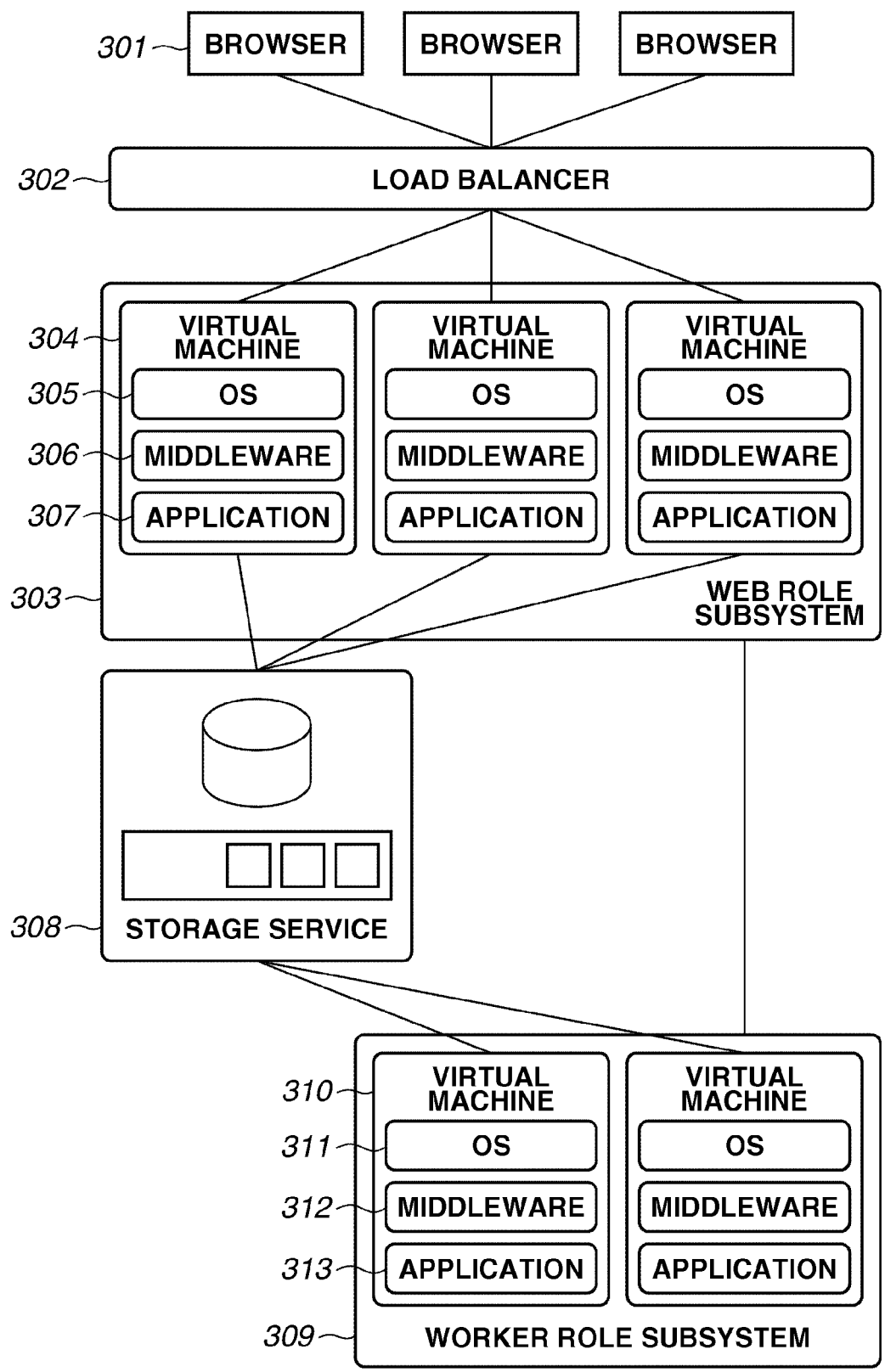
FIG. 3 illustrates an application execution environment of the printing system.

FIG. 3 illustrates an application execution environment of the printing system according to the present exemplary embodiment. This example is one configuration example of an application execution environment under a cloud computing environment.

Referring to FIG. 3, browsers 301 are executed by, for example, the client computers 109. The browsers 301 transmit/receive, for example, a display of a web page, a web request, and a web response. A load balancer 302 distributes loads of communication traffic. Virtual machines 304 are constituted by modules that will be described below.

Each virtual machine 304 includes an operating system (OS) 305, a middleware 306 such as a web server and an application server, and an application 307 executable on the OS 305 or the middleware 306.

A subsystem 303 is constituted by one or more virtual machines 304. The subsystem 303 is referred to as a Web role subsystem, since a main object thereof is to provide a web page and a web application (AP) to the respective browsers 301.

A storage service 308 stores, manages, and inputs/outputs various kinds of data. The storage service 308 provides, for example, a file system, a Key-Value Store (KVS), a queue, and a relational database (RDB), and these functions can be appropriately selected to be used according to a use's purpose and a data format.

Each of virtual machines 310 includes an OS 311, a middleware 312, and an application 313. The application 313 is executed by the OS 311 or the middleware 312. A subsystem 309 is constituted by one or more virtual machines 310, and is distinguished from the subsystem 303 by being referred to as a Worker role subsystem (subsystem) while the subsystem 303 is referred to as the Web role subsystem.

This is because, while the Web role subsystem 303 directly communicates with the browser 301 to display a web page and execute an application, an object of the Worker role subsystem 309 is to execute an application as a back-end service.

For example, processing expected to take a long time is executed by the subsystem 309, thereby allowing separation and individual execution of, for example, processing unsuitable to be performed by the Web role subsystem 303.

Each of the Web role subsystem 303 and the Worker role subsystem 309 can be constituted by the plurality of similar virtual machines 304 or 310, thereby enabling a load distribution of processing across the plurality of machines.

Further, another object to constitute the subsystems 303 and 309 by the plurality of virtual machines 304 or 310 is to establish a redundant server configuration. Even when some failure occurs to disable the server function at one of the virtual machines 304 or 310, execution of the application can be continued by the remaining servers.

The subsystems 303 and 309 can be flexibly and selectively configured. For example, one subsystem may be configured for each application, or one subsystem may be configured for a plurality of applications collectively. Hereinafter, a flow of execution of the applications 307 and 313 will be described with reference to FIG. 3.

The browser 301 transmits a web access request via the load balancer 302 in response to, for example, an entry of a Uniform Resource Locator (URL). This request is transferred to one of the virtual machines 304 in the Web role subsystem 303 by the load balancer 302 according to the load distribution method.

The application 307 in the virtual machine 304 to which the request is transferred executes a program corresponding to the request, and transmits a response to the browser 301 via the load balancer 302.

For the Worker role subsystem 309, examples of the applications 313, which operate as back-end programs, include a resident application and a batch program. The virtual machines 304 and 310 can access the storage service 308, and can store required data therein. For example, the application 307 registers a task that the application 313 should carry out into a queue of the storage service 308. Further, the application 307 stores data to be processed into, for example, a file system, a KVS or an RDB of the storage service 308.

The application 313 retrieves the task from the queue of the storage service 308, and sequentially carries out the task. When carrying out the task, the application 313 can also retrieve required data from the storage service 308, and store the data as the processing result into the storage service 308. Further, even the Web role subsystem 303 and the Worker role subsystem 309 can call up an Application Program Interface (API) and transmit/receive data by communicating with each other.

Figure 4:
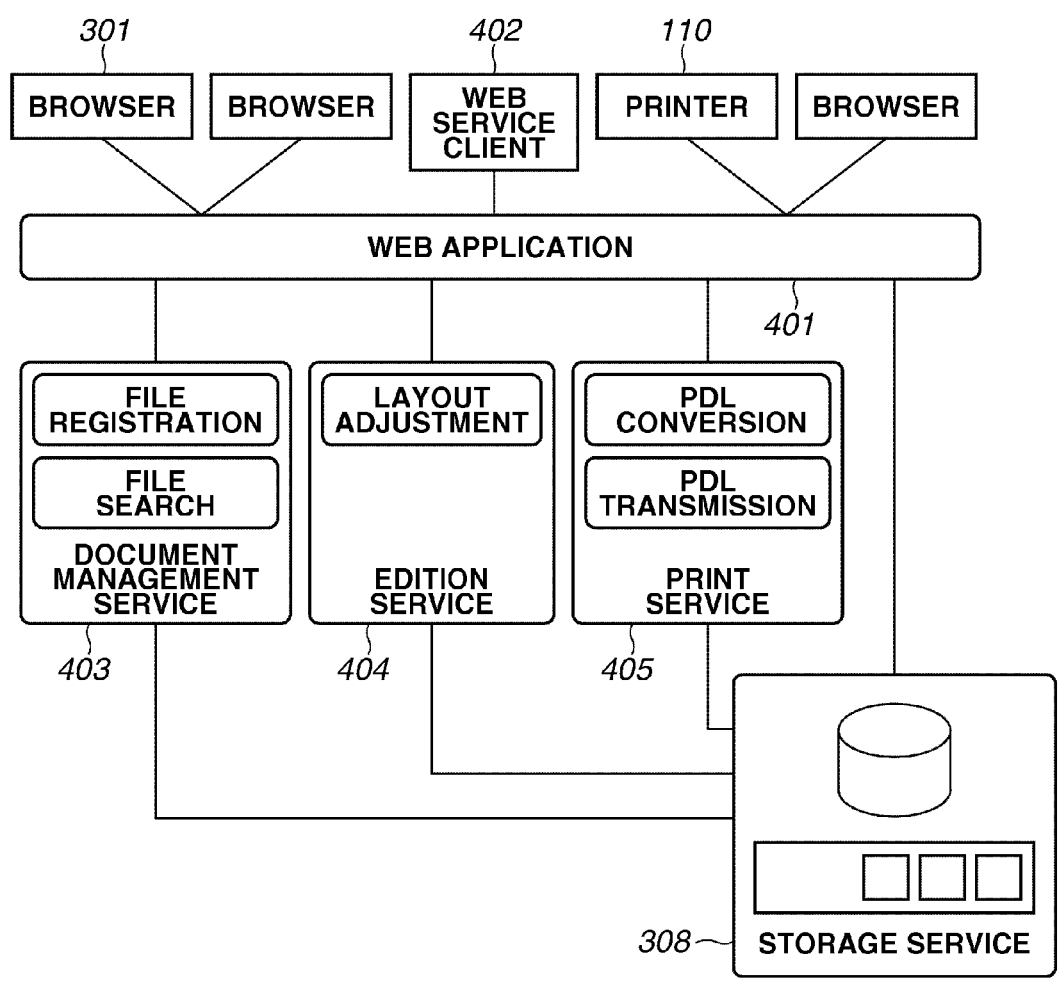
FIG. 4 illustrates a configuration of a print processing service of the printing system.

FIG. 4 illustrates a configuration of a print processing service of the printing system according to the present exemplary embodiment. An application 401 and services 403, 404, and 405, which will be described below, are either the Web role subsystem 303 or the Worker role subsystem 309 configured for each provided function, or a combination thereof. The application 401 and the services 403, 404, and 405 are realized as applications on the data processing apparatuses, such as the data processing apparatuses 105.

Referring to FIG. 4, the web application (hereinafter referred to as "web AP") 401 is disposed at the front end, and processes a request transmitted from the browser 301, a web service client 402, and a printer 110. A web service is one communication method of several communication methods used in cooperation between systems, and the web service client 402 is a client of a web service.

Normally, the browser 301 on the client computer 109 transmits/receives a request/response in response to a user's operation. The web AP 401 disposed on the front end generates HyperText Markup Language (HTML) data as a web user interface (web UI), and returns the data to the browser 301 to display the data on the browser 301.

On the other hand, the web AP 401 functions as a web service provider to the web service client 402, and receives an API call.

The service 403 is a document management service, and provides the function of, for example, registering and searching for a file specified as a document management target. The service 404 is an edition service that performs layout adjustment processing, and provides the function of print preparation process. The layout adjustment processing is a part of the function of print preparation process.

The service 405 is a print service, and provides the function of, for example, converting a print target file into Page Description Language (PDL) data, and transmitting the PDL data to the printer 110. In the present exemplary embodiment, the layout adjustment processing includes a two-sided printing request and an "N in 1 printing" request.

FIG. 5 illustrates a layout adjustment processing function provided by the edition service 404 illustrated in FIG. 4. This example is an example of margin removal processing based on the layout adjustment processing function as an example of reduced page printing.

Referring to FIG. 5, a page 501 is an example of one page of a print target file. The page 501 include text areas 502 and 504, and a graphic or image area 503.

The application that exercises the layout adjustment function of the edition service 404 illustrated in FIG. 4 analyzes the content of the page 501, and divides areas other than the text area 502, the image area 503, and the text area 504 into print margin areas 511 and 515, and margin areas 512, 513, and 514.

The print margins are areas where the printer 110 cannot print anything, and therefore should be untouched. However, the margin areas 512, 513, and 514 can be removed. However, a removal of all of the entire margin areas 512, 513, and 514 may adversely affect the legibility of the print product, and therefore minimum margin areas 521, 522, 523, and 524 are left to maintain the legibility.

A removal of the margin areas 512, 513, and 514 and a shift of the print target areas 502, 503, and 504 in the page head direction result in generation of a new margin area 525 at the last portion of the page.

This processing is applied to the pages from the first page sequentially. If a print target area of the next page can be shifted to a margin area generated at the last portion of the preceding page, the print target area is shifted across the page border. Application of this processing to all pages results in accumulation of margin areas at the last portion. If the accumulated margin areas occupy one page or more from the last page, the number of print target pages can be reduced by removing the page containing only margin areas.

The algorithm for removing margins by the above-described layout adjustment is relatively simple one. There are various algorithms for removing margins, as discussed in, for example, Japanese Patent Application Laid-Open No. 2005-149218 and Japanese Patent Application Laid-Open No. 2010-092305.

The present exemplary embodiment relates to a method for exercising the layout adjustment function under a web AP environment as will be described below, so that any limitation is not imposed on what kind of algorithm is employed for layout adjustment for removing margins. Therefore, the above description has been provided based on a simple margin removal algorithm by way of example.

FIG. 6 illustrates an example of a document information table generated by the edition service 404 illustrated in FIG. 4. This table is used in the management of information related to page reduction processing for each document identification (ID).

Referring to FIG. 6, a table 600 is a data storage area in the form of a table. A document ID 601 shows a document ID for identifying a processing target file. As a document ID 601, by using a unique ID in the document management service 403, which file is a processing target can be identified among managed files.

The column of the original file 602 stores the location of the file identified based on the document ID 601. The data stored in this column is referred to as "original file" to distinguish it from a layout adjustment result file 606, which will be described below.

The column of the number of pages of the original file 603 stores the number of pages of the original file 602. The column of the number of pages after layout adjustment 604 stores the number of pages after layout adjustment.

The column of the reduced number of pages 605 stores a result of layout adjustment, i.e., the reduced number of pages, which is a difference between the number of pages of the original file 603 and the number of pages after layout adjustment 604.

The column of the layout adjustment result file 606 stores the location of an intermediate file where a layout adjustment result is stored. The column of the thumbnail file of a layout adjustment result page 607 stores the location of a thumbnail file generated from each page of the layout adjustment result file 606.

FIG. 7 illustrates an example of a user interface (UI) displayed on, for example, a display of the hardware user interface 201 of the printing system according to the present exemplary embodiment. This example, which includes web-based and graphical interfaces, is an example of a UI allowing a user to set threshold values for determining a page reduction effect or a print sheet reduction effect due to the layout adjustment function.

Referring to FIG. 7, a user interface 700 is displayed to allow a user to set threshold values for determining the reduction effect. A threshold value (1) 701 and a threshold value (2) 702 serve as evaluation reference values used in evaluation of a page or print sheet reduction effect by layout adjustment. The threshold value (1) 701 is compared to the actual reduced number of pages after layout adjustment. The value "2" is displayed in this field currently and can be set by a user to another value. A threshold value (2) 702 is compared to the actual reduced number of print sheets. The value "1" is displayed in this field currently and can be set by a user to another value.

FIG. 8 illustrates example user interfaces (UIs) displayed on the printing system according to the present exemplary embodiment. These examples illustrate UIs that display an original file and a layout adjustment result file. These UI screens are displayed on the browser 301 as user interfaces for instructing reduced page printing that is recommended to a user according to the evaluation result about the page reduction effect, which will be described below.

Referring to FIG. 8, a UI 800 is displayed when a layout adjustment result file is recommended. A radio button 801 allows a user to select an original file. A filename 802 indicates the filename of the original file, and also serves as a hyperlink to the location of the original file.

The original file indicated by the filename 802 corresponds to an original file 602 as might be illustrated in FIG. 6. A page number 803 indicates the number of pages of the original file, and corresponds to the number of pages of the original file 603. An area 804 is an area where a thumbnail of each page of the original file is displayed.

A radio button 805 allows a user to select a layout adjustment result file. A filename 806 indicates the filename of the layout adjustment result file, and also serves as a hyperlink to the location of the layout adjustment result file. The layout adjustment result file indicated by the filename 806 corresponds to a layout adjustment result file 606 as might be illustrated in FIG. 6.

A page number 807 indicates the number of pages of the layout adjustment result file and the number of pages that has been reduced compared to the original file. The page number 807 corresponds to a number of pages after layout adjustment 604 and a reduced number of pages 605. An area 808 is an area where a thumbnail of each page of the layout adjustment result file is displayed, and corresponds to a layout adjustment result page 607 storing a location of a thumbnail file generated from each page of the layout adjustment result file 606.

A UI 820 is displayed when selection of a layout adjustment result file is prohibited. Items 821 to 828 are similar to the above-described items 801 to 808. A difference of the UI 820 from the UI 800 is that the radio button 825 is controlled so as to be prohibited to be selected, and the radio button 821 allows only selection of the original file.

FIG. 9 illustrates example user interfaces (UIs) displayed on the printing system according to the present exemplary embodiment. These examples illustrate a UI that allows a user to specify an imposition condition and UIs that show an original file and a layout adjustment result file. These UI screens are displayed on the browser 301 as user interfaces for instructing reduced page printing that is recommended to a user to instruct the reduced page printing.

Referring to FIG. 9, a UI 900 allows a user to specify imposition conditions. A check box 901 allows a user to specify whether the imposition conditions are reflected in the determination about the print sheet reduction effect. A control 902 allows a user to specify a multiple-up layout condition such as one-up layout (1 in 1), two-up layout (2 in 1), four-up layout (4 in 1), and six-up layout (6 in 1). A control 903 allows a user to specify the printing method such as one-sided printing, two-sided printing, and bookbinding printing.

A UI 920 is a UI that recommends a layout adjustment result file. A radio button 921 allows a user to select an original file. A page number 922 indicates the number of pages of the original file.

A print sheet number 923 indicates the required number of print sheets when the page number 922 is printed under the imposition conditions specified at the controls 902 and 903. In this example, the two-up layout condition and the two-sided printing condition are specified, whereby four pages can be printed on one sheet so that the print sheet number 923 is calculated as 20/4=5 sheets with use of the edition service 404.

A radio button 924 allows a user to select the layout adjustment result file. A page number 925 indicates the number of pages of the layout adjustment result file, and the reduced number of pages. A print sheet number 926 indicates the required number of print sheets when the number of pages of the layout adjustment result file 925 is printed under the imposition conditions specified at the controls 902 and 903.

Further, the required number of print sheets 926 includes the reduced number of print sheets in parentheses, which is the difference from the required number of print sheets 923 for the original file. A UI 940 is a UI that recommends an original file via a radio button 941 since a file with margin removed requires seventeen sheets of printed pages whereas the original file requires five sheets of printed pages after applying the imposition conditions 902, 903. Items 941 to 946 are similar to the above-described items 921 to 926, and therefore the description thereof is omitted here.

Figure 10:
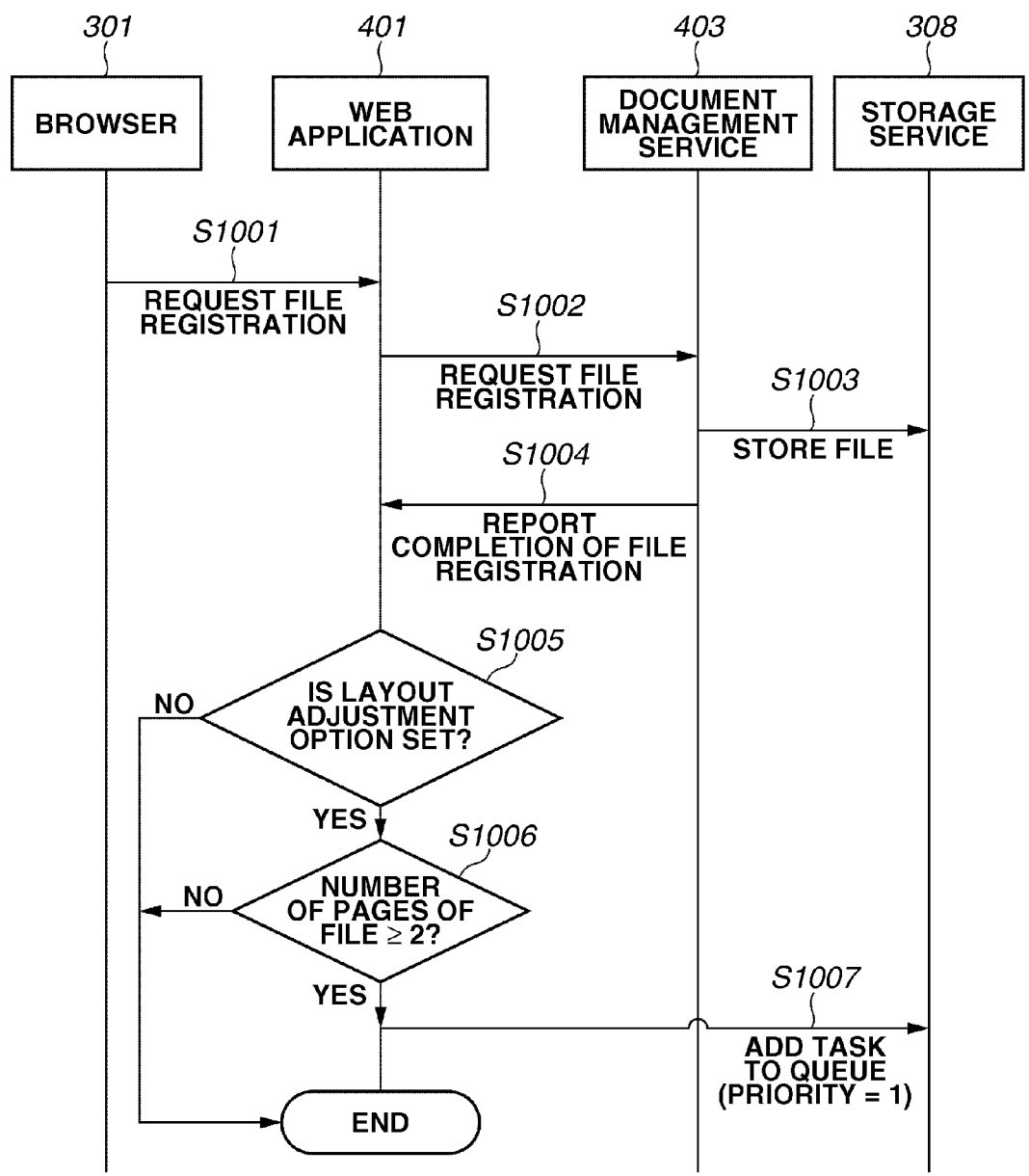
FIG. 10 is a flowchart illustrating data processing performed by the printing system.

FIG. 10 is a flowchart illustrating data processing of the printing system according to the present exemplary embodiment. This example is an example of data processing at the time of file registration. Hereinbelow, the steps performed by the browser 301, the web AP 401, the document management service 403, and the storage service 308 in the printing system will be described.

The CPUs 203 of the data processing apparatus 105 and the server apparatus 106 executing the browser 301, the web AP 401, the document management service 403, and the storage service 308 load corresponding programs onto the RAMs 205, and execute them, by which the respective steps can be realized. Hereinbelow, the flowchart will be described assuming that the browser 301, the web AP 401, the document management service 403, and the storage service 308 perform the processing.

In step S1001, the browser 301 of the client computer 109 transmits a file registration request to the web AP 401.

In step S1002, the web AP 401 transmits a file registration request to the document management service 403.

In step S1003, the document management service 403 requests the storage service 308 to store the received file, thereby storing the received file into the hard disk (HDD) provided in the data processing apparatus 105 as storage processing by the storage service 308. At this time, the document ID 601, which is a unique ID enabling identification of this file, is assigned to this file.

Next, in step S1004, the document management service 403 notifies the web AP 401 of file registration completion. As noted above, the user interface 700 allows a user to set threshold values for determining a reduction effect. In step S1005, the web AP 401 determines whether a layout adjustment option is set. More specifically, in step S1005, the web application 401 performs first determination processing, which is a determination whether an edition service is registered to the document information acquired from the browser 301.

At this time, the web AP 401 determines whether the layout adjustment option is set by, for example, determining whether a license of the layout adjustment option is purchased for each user.

Then, if the web AP 401 determines that the layout adjustment option is set (YES in step S1005), in step S1006, the web AP 401 further determines whether the number of pages of the original file is two or larger. If the web AP 401 determines that the layout adjustment option is not set (NO in step S1005), the present processing is ended.

If the web AP 401 determines in step S1006 that the number of pages of the original file is two or larger (YES in step S1006), in step S1007, the web AP 401 adds the task of layout adjustment execution to the queue of the storage service 308 while setting the priority of this task to "1". Then, the present processing is ended.

Step S1007 corresponds to processing of specifying the priority that determines the processing order of document information that should be processed. Further, step S1007 corresponds to first request processing in which the server apparatus 106 executing the web application 401 requests the first data processing apparatus 105 executing the storage service 308 to store document information acquired from the browser 301.

On the other hand, if the web AP 401 determines that the number of pages of the original file is one or smaller (NO in step S1006), this means that the number of pages cannot be further reduced even if layout adjustment is performed, so that layout adjustment is omitted and the present processing is ended.

FIG. 11 illustrates an example of a task processing table in the printing system according to the present exemplary embodiment. Now, the structure of the queue managed by the storage service 308 will be described.

Referring to FIG. 11, a table 1100 indicates the structure of the queue. A task ID 1101 stores a task ID which is a unique ID enabling identification of a task. A task priority 1102 stores task priority that indicates task execution priority.

In this example, a larger numerical value of the task priority 1102 indicates a higher-priority task that should be carried out first. A task description 1103 stores a document ID of a file that should be processed. In this example, this column stores a document ID enabling identification of a file that is a target of layout adjustment execution.

In the example of the queue 1100, tasks are sequentially stored into the queue in the registration order, and task IDs are sequentially assigned thereto. Then, the tasks in the queue are sorted in the order of the task priority in such a manner that the task having the highest priority is positioned in the head of the queue.

Figure 12:
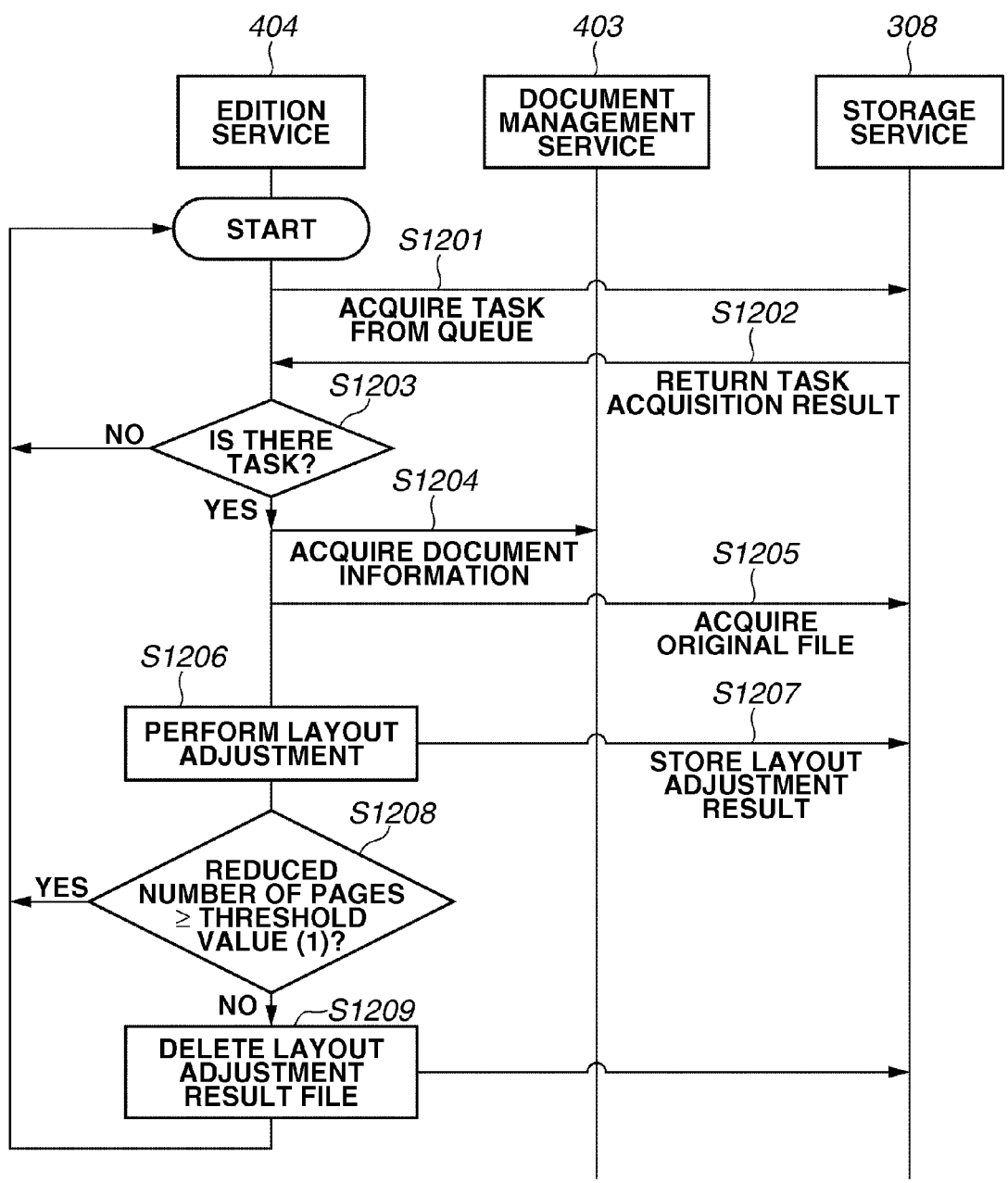
FIG. 12 is a flowchart illustrating data processing performed by the printing system.

FIG. 12 is a flowchart illustrating data processing performed by the printing system according to the present exemplary embodiment. This example indicates processing that the edition service 404 performs with the storage service 308 at timing out of synchronization with the exchange with the browser 301. More specifically, the edition service 404 mainly performs the layout adjustment processing on document information managed by the storage service 308.

The CPUs 203 of the data processing apparatus 105 and the server apparatus 106 executing the edition service 404, the document management service 403, and the storage service 308 load corresponding programs onto the RAMs 205 and execute them, by which the respective steps can be realized. Hereinbelow, the flowchart will be described assuming that the edition service 404, the document management service 403, the storage service 308, and the web AP 401 perform the processing.

First, in step S1201, the edition service 404 acquires the first task from the queue 1100 in the storage service 308. Next, in step S1202, the storage service 308 returns the task acquisition result to the edition service 404.

Then, in step S1203, the edition service 404 confirms whether there is a task. If the edition service 404 confirms that there is not a task (NO in step S1203), the processing proceeds to step S1201 for acquisition of a task. If the edition service 404 confirms that there is a task (YES in step S1203), the processing proceeds to step S1204.

Then, in step S1204, the edition service 404 identifies the document ID that is a processing target from the task description 1103, and acquires, from the document management service 403, document information that may be required, such as the location of the original file. Further, in step S1205, the edition service 404 acquires the original file from the storage service 308, such as by using the acquired location of the original file.

Next, in step S1206, the edition service 404 executes the layout adjustment application on the acquired original file. In step S1207, the layout adjustment processing result is stored in the storage service 308, as illustrated in the processing result table 600.

This step S1207 corresponds to second request processing in which the second data processing apparatus 105 executing the edition service 404 requests the first data processing apparatus 105 executing the storage service 308 to store the layout adjustment processing result.

Next, in step S1208, the edition service 404 compares the reduced number of pages 605 and the threshold value (1) 701 to determine whether the reduced number of pages 605 exceeds the value of the threshold value (1) 701. If the edition service 404 determines in step S1208 that the reduced number of pages 605 is equal to or larger than the threshold value (1) 701 (YES in step S1208), the edition service 404 determines that the layout adjustment is effective in a page reduction, and ends the execution of the task. Then, the processing proceeds to step S1201 again for acquisition of the next task.

Step S1208 corresponds to second determination processing in which the second data processing apparatus 105 executing the edition service 404 determines whether the reduced page printing should be performed.

On the other hand, if the edition service 404 determines that the reduced number of pages 605 is smaller than the threshold value (1) 701 (NO in step S1208), the edition service 404 determines that the layout adjustment is not effective for a page reduction. Then, in step S1209, the edition service 404 deletes the layout adjustment result file stored in the location of the layout adjustment result file 606, and then the processing proceeds to step S1201 again.

It should be noted that the edition service 404 does not delete but leaves the number of pages after layout adjustment 604, the reduced number of pages 605, and the thumbnail file of layout adjustment result page 607 associated with the corresponding document ID in the table illustrated in FIG. 6. These items are kept stored as a trace indicating that layout adjustment has been already performed on the corresponding file.

Execution of this step S1209 can save the storage resource by deleting the layout adjustment result file if it is determined that the page reduction effect is not sufficient as a result of the layout adjustment. This can bring about a benefit of solving the above-described third problem.

Figure 13:
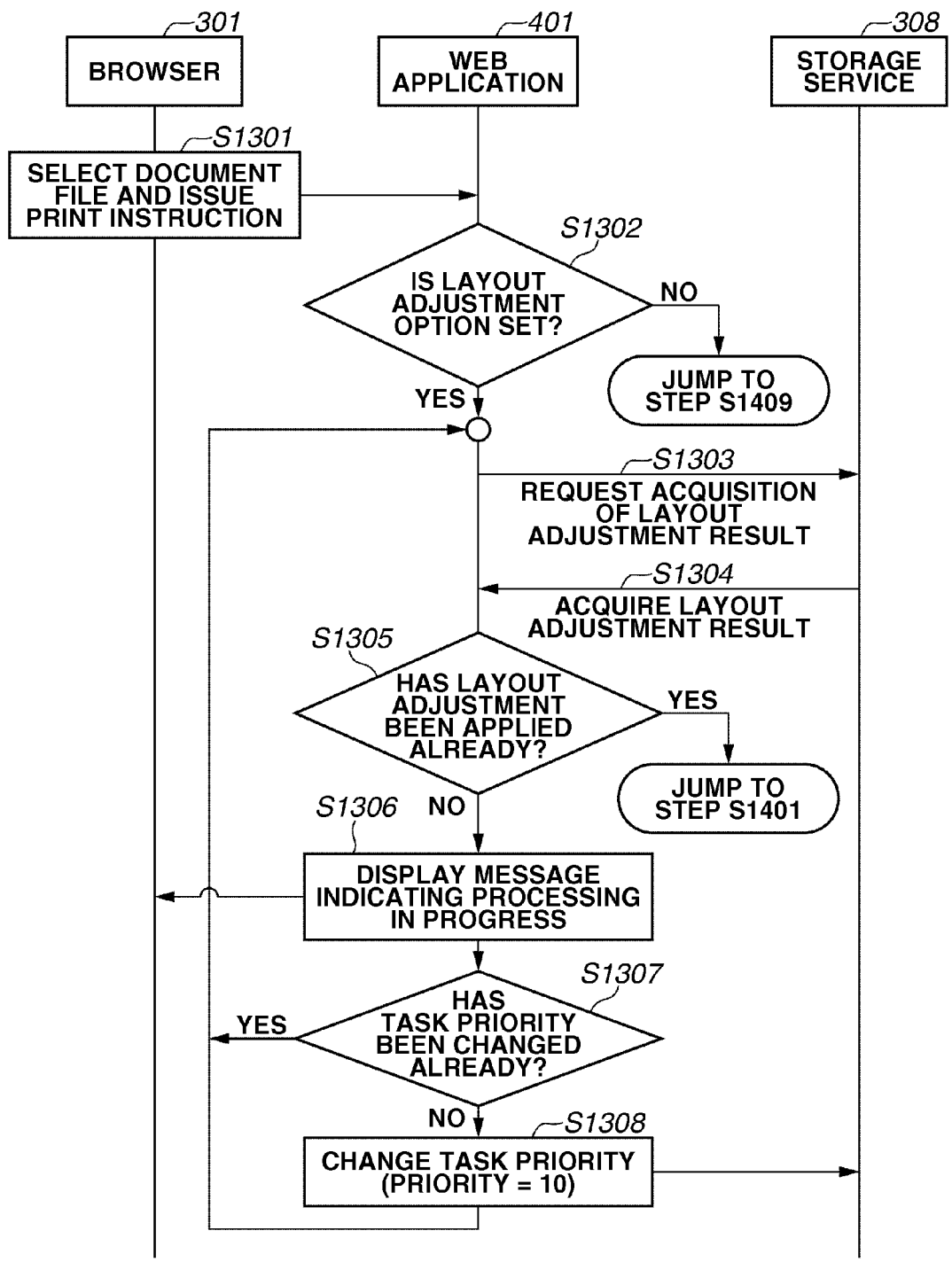
FIG. 13 is a flowchart illustrating data processing performed by the printing system.
Figure 14:
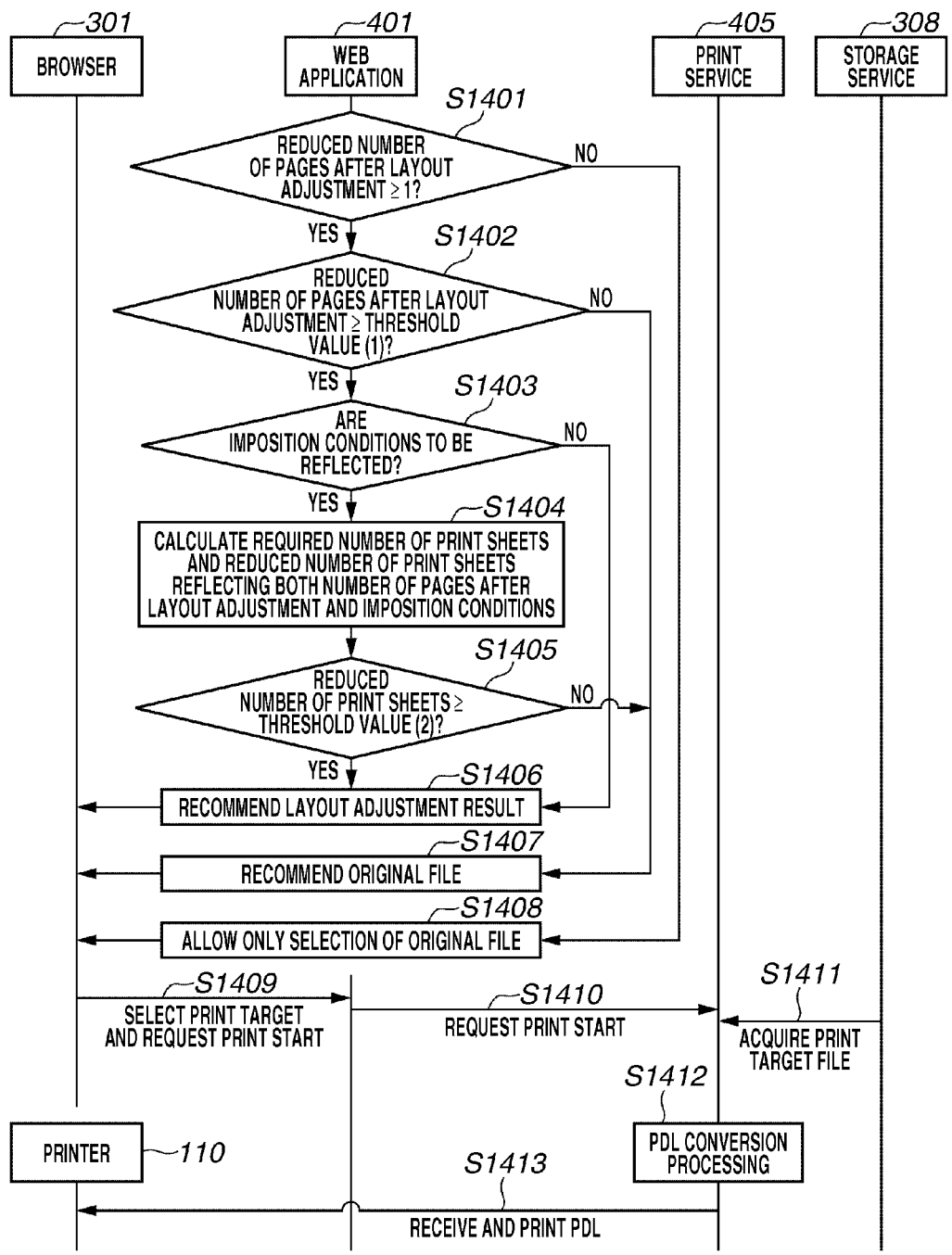
FIG. 14 is a flowchart illustrating data processing performed by the printing system.

FIGS. 13 and 14 are flowcharts illustrating data processing performed by the printing system according to the present exemplary embodiment. This example is an example of processing performed when a requests to print a file is transmitted from the browser 301 by a user's operation.

The CPUs of the data processing apparatus and the server apparatus executing the browser 301, the web PA 401, and the storage service 308 load corresponding programs onto, for example, the RAMs and execute them, by which the respective steps can be realized. Hereinbelow, the flowcharts will be described assuming that the browser 301, the storage service 308, the web PA 401, and the print service 405 perform the processing.

First, in step S1301, the browser 301 displays a UI allowing a user to select a print target file on the display apparatus of the client computer 109, receives a print instruction from the user, and transmits an instruction request to print the print target file to the web AP 401.

Next, in step S1302, the web AP 401 determines whether the layout adjustment option is set in a similar manner to step S1005. If the web AP 401 determines in step S1302 that the layout adjustment option is not set (NO in step S1302), the processing proceeds to step S1409.

On the other hand, if the web AP 401 determines in step S1302 that the layout adjustment option is set (YES in step S1302), in step S1303, the web AP 401 requests acquisition of the layout adjustment result while specifying the document ID 601 of the print target file as a search condition to the table in the storage service 308 illustrated in FIG. 6.

In response to this request, in step S1304, the storage service 308 returns the layout adjustment result to the web AP 401.

Next, in step S1305, the web AP 401 determines whether layout adjustment has been already applied to that file. If the web AP 401 determines in step S1305 that layout adjustment has been already applied to that file (YES in step S1305), the processing proceeds to step S1401.

On the other hand, if the web AP 401 determines that layout adjustment has not been applied to that file yet (NO in step S1305), in step S1306, the browser 301 displays a message indicating that the processing is in progress on the client computer 109.

Next, in step S1307, the web AP 401 determines whether the task priority has been already changed. If the web AP 401 determines in step S1307 that the task priority has not been changed yet (NO in step S1307), in step S1308, for example, the web AP 401 changes the task priority of the print target file to "10" in the queue 1100 in the storage service 308, if this is the first time.

After that, the processing proceeds to step S1303 again, and the web AP 401 repeats a request for acquisition of the layout adjustment result until the edition service 404 completes the execution of layout adjustment.

During and after the second time of the repetition, since the task priority has been already changed, step S1308 is unnecessary (YES in step S1307). This change in the task priority in step S1308 allows task priority to be distinguished and controlled between a request from an online user and a task that should be performed as a background task.

In this way, despite asynchronous execution of layout adjustment by the edition service 404, a user does not have to wait for a result for a long time since the priority is changed to a higher priority and the execution result can be quickly acquired when a print request to an unprocessed file is transmitted from the browser 301 by a user's operation. As a result, the present exemplary embodiment can bring about a benefit of solving the above-described second problem.

Now, the processing illustrated in FIG. 14 will be described. In step S1401, the web AP 401 determines whether the reduced number of pages 605 is one or larger from the layout adjustment result acquired in step S1304. If the web AP 401 determines in step S1401 that the reduced number of pages 605 is smaller than one (NO in step S1401), in step S1408, the web AP 401 causes the UI 820 allowing only selection of the original file to be displayed on the display apparatus via the browser 301 of the client computer 109.

It should be noted that, in the UI 820, for example, the reduced number of pages 827 and the thumbnail 828 can be confirmed as a trace of the layout adjustment result, although the layout adjustment result file has been already deleted, and cannot be used now.

On the other hand, if the web AP 401 determines in step S1401 the reduced number of pages 605 is one or larger (YES in step S1401), in step S1402, the web AP 401 further determines whether the reduced number of pages 605 is equal to or larger than the threshold value (1) 701.

If the web AP 401 determines in step S1402 that the reduced number of pages 605 is smaller than the threshold value (1) 701 (NO in step S1402), the processing proceeds to step S1407. Then, in step S1407, the web AP 401 determines that the layout adjustment is not sufficiently effective for a page reduction and therefore instructs the browser 301 of the client computer 109 to display a UI that recommends the original file.

A difference of this UI that recommends the original file from the UI 820 is only that the radio button 821 is indicated as a recommended option, and the radio button 825 is not prohibited to be selected but is allowed to be selected.

In step S1408, the web AP 401 notifies the browser 301 of the client computer 109 of the fact that it is possible to confirm, for example, the reduced number of pages 827 and the thumbnail 828 as a trace of the layout adjustment result although the layout adjustment result file has been already deleted and cannot be used now.

Even if the unrecommended layout adjustment result file is selected despite the determination of step S1402, the layout adjustment result file has been already deleted in step S1209. Steps S1406, S1407, and S1408 are user interface providing processing by the web AP 401.

Therefore, the web AP 401 should register a task of layout adjustment execution to the queue 100 again to acquire the layout adjustment result. This redundancy is still fully acceptable as an exceptional process that may rarely occur, since, despite this possibility, it is helpful to get the benefit of saving the storage occupied capacity by deleting the layout adjustment result file determined to be not sufficiently effective in a page reduction in step S1209.

Further, re-registering the task with the priority set to "10" in a similar manner to step S1308 allows preferential acquisition of the layout adjustment result file even for this exception process.

In step S1403, the web AP 401 determines whether imposition conditions should be reflected from the input to the check box 901. If the web AP 401 determines in step S1403 that the imposition conditions should not be reflected (NO in step S1403), in step S1406, the web AP 401 instructs the browser 301 to display the UI 800, which recommends the layout adjustment result, since the web AP 401 has already determined in step S1402 that the layout adjustment is effective for a page reduction.

On the other hand, if the web AP 401 determines in step S1403 that the imposition conditions should be reflected (YES in step S1403), in step S1404, the web AP 401 calculates the required number of print sheets and the reduced number of print sheets in consideration of the number of pages after layout adjustment and the imposition conditions 902 and 903.

Next, in step S1405, the web AP 401 determines whether the reduced number of print sheets is equal to or larger than the threshold value (2) 702. If the web AP 401 determines in step S1405 that the reduced number of print sheets is smaller than the threshold value (2) 702 (NO in step S1405), in step S1407, the web AP 401 causes the browser 301 to display the UI 940, which recommends the original file.

On the other hand, if the web AP 401 determines in step S1405 that the reduced number of print sheets is equal to or larger than the threshold value (2) 702 (YES in step S1405), in step S1406, the web AP 401 instructs the browser 301 of the client computer 109 to display the UI 920, which recommends the layout adjustment result file.

In this way, layout adjustment is performed asynchronously, whereby a processing result is prepared in advance. As a result, it is possible to present the page reduction effect or the print sheet reduction effect as the layout adjustment result to a user via the browser 301 of the client computer 109, like steps S1406, S1407, and S1408.

Further, it is possible to present options to a user by allowing the user to compare the page reduction effect or the print sheet reduction effect with the original file to print a desired one of the original file and the layout adjustment result file. As a result, the present exemplary embodiment can bring about a benefit of solving the above-described first problem.

A user selects a print target from the original file and the layout adjustment result file on the UI displayed by the browser 301 on the client computer 109 in any of the above-described steps S1406, S1407, and S1408. According to this selection operation, a print start is instructed to the print service 405 in a user-driven manner.

In step S1409, the browser 301 transmits the print target and a request for a print start to the web AP 401. If the web AP 401 has determined in step S1302 that the layout adjustment option is not set, the browser 301 transmits only a request for a print start since it is obvious that the original file is the print target file.

Next, in step S1410, the web AP 401 transmits the location of the print target file and a print start request to the print service 405. Step S1410 corresponds to third request processing in which the server apparatus 106 executing the web AP 401 requests a print service to the third data processing apparatus 105 executing the print service 405.

In step S1411, the print service 405 acquires the print target file (print information) from the storage service 308. In step S1412, the print service 405 performs PDL conversion processing. At this time, the print service 405 generates print information that the printer 110 should print according to the document information and the layout adjustment information received from the storage service 308.

Next, in step S1413, the printer 110 receives the PDL data from the print service 405, and prints a desired final product.

FIG. 15 is a flowchart illustrating data processing performed by the printing system according to the present exemplary embodiment. This example is an example of processing performed for acquisition of the layout adjustment result via the API of the web service.

The CPUs of the data processing apparatus and the server apparatus executing the web service client 402, the web AP 401, and the storage service 308 load corresponding programs onto the RAMs and execute them, by which the respective steps can be realized.

Hereinbelow, the flowchart will be described assuming that the web service client 402, the storage service 308, and the web AP 401 perform the processing.

First, in step S1501, the web service client 402 specifies, for example, the document ID 601, and transmits a request for acquisition of the layout adjustment result of the file to the web AP 401. In step S1502, the web AP 401 transmits a request for acquisition of the layout adjustment result to the processing result table 600 in the storage service 308 while setting the specified document ID 601 as a search condition.

Next, in step S1503, the storage service 308 returns the layout adjustment result to the web AP 401.

In step S1504, the web AP 401 determines whether layout adjustment has been already applied to the target file. If the web AP 401 determines that layout adjustment has been already applied to the target file (YES in step S1504), in step S1507, the web AP 401 returns the layout adjustment result acquired in step S1503 to the web service client 402.

On the other hand, if the web AP 401 determines in step S1504 that layout adjustment has not been applied to the target file yet (NO in step S1504), in step S1506, the web AP 401 requests the storage service 308 to change the task priority to "5" in the queue 1100 only if this is the first time (NO in step S1505).

After that, the web AP 401 repeatedly requests acquisition of the layout adjustment result in step S1502 until layout adjustment has been completed. During and after the second routine of the repetition, since the task priority has been already changed, step S1506 is unnecessary (YES in step S1505).

This change in the task priority in step S1506 allows the task priority to be distinguished and controlled between a request in the web service and a task that should be performed as a background task. In this way, it is possible to perform control in such a manner that a waiting time in response to a request is reduced as much as possible not only in the service of the web AP 401 to the browser 301 but only in calling up of API in the web service.

This is another example of ways for acquiring the benefit of solving the above-described second problem. As a result, in the printing system providing the print service, it is possible to realize the service of presenting the print page or sheet reduction effect to a user by using the user interface without imposing a load onto the system in response to a print request from a client.

More specifically, under the cloud computing environment, during execution of the print service accompanied by a presentation indicating whether layout adjustment is effective in a page reduction, the following benefits can be acquired.

First, since layout processing is realized at timing out of synchronization with the browser 301 on the client apparatus 109, it is possible to avoid such a situation that layout processing performed by the data processing apparatus 105 in the system is inundated with requests.

Further, the layout result is deleted for a print service registered by a user, if it is determined from document information to be printed that layout adjustment is not effective for a page reduction. As a result, it is possible to omit storage of a layout result that cannot satisfy the preset page reduction effect to thereby save the HDD resource for data storage even when access surges.

Further, a user can select a print request as the user wants while visually and comparatively checking the layout print result and the original print result recommended on the UI screen according to the level of the page reduction effect processed asynchronously.

The steps of the present exemplary embodiment can be also realized by causing a processing apparatus (CPU or processor) of, for example, a personal computer (computer) to execute software (program) acquired via a network or various kind of storage media.

The present invention is not limited to the foregoing exemplary embodiments, and various modifications (including an organic combination of exemplary embodiments) may be made based on the spirit of the present invention, and such modifications are within the scope of the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. In an example, a computer-readable storage medium may store a program that causes a printing system to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-124867 filed Jun. 3, 2011, which is hereby incorporated by reference herein in its entirety.

What is claimed is:

1. A printing system in which a web application of a server apparatus configured to respond to a browser of a client apparatus provides a print service to the client apparatus by controlling a plurality of data processing apparatuses in charge of the print service, the printing system comprising:

the server apparatus, wherein the server apparatus includes
a first determination unit configured to determine, as a first determination of the printing system and using the server apparatus, whether an edition service to be performed in advance of the print service is registered to document information acquired from the browser, and
a first request unit configured to request, as a first request of the printing system and using the server apparatus, a first data processing apparatus to store the document information in response to the first determination unit determining that the edition service is registered;

the first data processing apparatus, wherein the first data processing apparatus is configured to perform a storage service, includes a storage unit, and further is configured to acquire, in response to a request from the first request unit and using the first data processing apparatus, the document information and store the document information in the storage unit of the first data processing apparatus as document information to which layout adjustment processing is to be applied; and a second data processing apparatus, wherein the second data processing apparatus includes a confirmation unit configured to confirm, as confirmation by the second data processing apparatus, whether the storage unit stores the document information to which layout adjustment processing is to be applied, a layout adjustment unit configured to acquire the document information from the storage unit in response to the confirmation unit confirming that the storage unit stores the document information to which the layout adjustment processing is to be applied and apply, as layout adjustment by the second data processing apparatus, the layout adjustment processing to the document information acquired from the storage unit to obtain a layout adjustment having a reduced number of pages value, a second request unit configured to request, as a second request of the printing system and using the second data processing apparatus, the first data processing apparatus to store a result of the layout adjustment processing as the layout adjustment, a second determination unit configured to determine, as a second determination of the printing system and using the second data processing apparatus, whether reduced page printing is to be performed by comparing the reduced number of pages value based on the result of the layout adjustment processing and a threshold value set in advance of the second determination, and a deletion instruction unit configured to instruct, as a deletion instruction of the printing system and using the second data processing apparatus, the first data processing apparatus to delete the result of the layout adjustment processing stored in the storage unit in response to the second determination unit determining as the second determination that the reduced page printing is not to be performed.

2. The printing system according to claim 1, wherein the server apparatus further includes an evaluation unit configured to acquire the result of the layout adjustment processing from the first data processing apparatus in response to a print request acquired from the browser to evaluate the reduced number of pages value according to an evaluation reference value set in advance, a user interface providing unit configured to provide the browser with a user interface for instructing the reduced page printing to be recommended to a user according to a result of the evaluation by the evaluation unit, and a third request unit configured to receive, from the browser, a print request that the user issues to the user interface, and request a third data processing apparatus to perform the print service.

3. The printing system according to claim 2, wherein the third data processing apparatus includes a receiving unit configured to receive the stored document information from the first data processing apparatus according to the request from the server apparatus, and a generation unit configured to generate print information to be printed by a printing apparatus according to the document information received by the receiving unit and layout adjustment information.

4. The printing system according to claim 2, wherein the user interface receives an imposition request executable according to the result of the layout adjustment processing.

5. The printing system according to claim 2, wherein the evaluation unit acquires the result of the layout adjustment processing from the first data processing apparatus in response to the print request including an imposition request acquired from the browser, and evaluates the reduced number of pages value according to the evaluation reference value set in advance.

6. The printing system according to claim 5, wherein the imposition request includes a request for N in 1 printing and a request for two-sided printing.

7. The printing system according to claim 1, wherein the confirmation unit confirms whether the storage unit stores the document information to which the layout adjustment processing is to be applied, at timing asynchronous with the server apparatus and the client apparatus.

8. The printing system according to claim 1, wherein the server apparatus further includes a specifying unit configured to specify priority, which determines a processing order of the document information to be performed by the confirmation unit, at a time of determination of a number of pages of the document information acquired from the browser and storage of the document information into the storage unit.

9. The printing system according to claim 8, wherein the server apparatus further includes a change unit configured to change the priority specified by the specifying unit to acquire the result of the layout adjustment processing from the first data processing apparatus in response to the print request acquired from the browser.

10. A service processing method for a printing system in which a web application of a server apparatus configured to respond to a browser of a client apparatus provides a print service to the client apparatus by controlling a plurality of data processing apparatuses in charge of the print service, the service processing method comprising determining, as a first determination of the printing system and using the server apparatus, whether an edition service to be performed in advance of the print service is registered to document information acquired from the browser, and requesting, as a first request of the printing system and using the server apparatus, a first data processing apparatus to store the document information in response to determining that the edition service is registered;

acquiring, in response to a request and using the first data processing apparatus, the document information and storing the document information in a storage unit of the first data processing apparatus as document information to which layout adjustment processing is to be applied;

confirming, as confirmation by the second data processing apparatus, whether the storage unit stores the document information to which layout adjustment processing is to be applied, acquiring the document information from the storage unit in response to the confirmation unit confirming that the storage unit stores the document information to which the layout adjustment processing is to be applied and applying, as layout adjustment by the second data processing apparatus, the layout adjustment processing to the document information acquired from the storage unit to obtain a layout adjustment having a reduced number of pages value, requesting, as a second request of the printing system and using the second data processing apparatus, the first data processing apparatus to store a result of the layout adjustment processing as the layout adjustment, determining, as a second determination of the printing system and using the second data processing apparatus, whether reduced page printing is to be performed by comparing the reduced number of pages value based on the result of the layout adjustment processing and a threshold value set in advance of the second determination, and instructing, as a deletion instruction of the printing system and using the second data processing apparatus, the first data processing apparatus to delete the result of the layout adjustment processing stored in the storage unit in response to determining as the second determination that the reduced page printing is not to be performed.

11. A non-transitory computer-readable storage medium storing a program for causing a computer to perform the service processing method according to claim 10.

* * * * *